(12) United States Patent
Eye et al.

(10) Patent No.: US 10,664,870 B2
(45) Date of Patent: May 26, 2020

(54) EMAIL-BASED PROMOTION FOR USER ADOPTION

(71) Applicant: Boxer, Inc., Austin, TX (US)

(72) Inventors: Andrew Eye, Buda, TX (US); Adam Cianfichi, Newark, DE (US)

(73) Assignee: BOXER, INC., Austin, TX (US)

( * ) Notice: Subject to any disclaimer, the term of this patent is extended or adjusted under 35 U.S.C. 154(b) by 879 days.

(21) Appl. No.: 14/199,628

(22) Filed: Mar. 6, 2014

(65) Prior Publication Data

US 2014/0279030 A1  Sep. 18, 2014

Related U.S. Application Data

(60) Provisional application No. 61/781,776, filed on Mar. 14, 2013.

(51) Int. Cl.
*G06Q 30/02* (2012.01)

(52) U.S. Cl.
CPC ................ *G06Q 30/0267* (2013.01)

(58) Field of Classification Search
CPC .................................................. G06Q 50/08
USPC ..................................................... 705/14.73
See application file for complete search history.

(56) References Cited

U.S. PATENT DOCUMENTS

| | | | | |
|---|---|---|---|---|
| 2005/0096982 | A1* | 5/2005 | Morton ................ | G06Q 10/107 705/14.73 |
| 2007/0282658 | A1* | 12/2007 | Brintle .................. | G06Q 10/06 705/7.15 |
| 2008/0057926 | A1* | 3/2008 | Forstall ................. | G06F 3/0482 455/415 |
| 2014/0282243 | A1* | 9/2014 | Eye ..................... | G06F 3/04883 715/810 |

OTHER PUBLICATIONS

VMware goes after Outlook with Boxer email app for Airwatch, Blair Hanley Frank https://www.pcworld.com/article/3051807/vmware-goes-after-outlook-with-boxer-email-app-for-airwatch.html (Year: 2016).*

* cited by examiner

*Primary Examiner* — James M Detweiler
*Assistant Examiner* — Darnell A Pouncil
(74) *Attorney, Agent, or Firm* — Thomas | Horstemeyer, LLP

(57) ABSTRACT

Methods, systems, and apparatus, including computer programs encoded on a computer storage medium, for receiving, by the one or more processors, user input, the user input indicating an assignment of a particular task by a first user to a second user, the first user being a user of a product that provides the particular task; determining, by the one or more processors, that the second user is a non-user of the product and, in response: appending product promotion data to an electronic document, the product promotion data providing a summary of task-based action data that is associated with the second user; and transmitting the electronic document to the second user.

20 Claims, 5 Drawing Sheets

EMAIL-BASED PROMOTION FOR USER ADOPTION

CROSS-REFERENCE TO RELATED APPLICATIONS

This application claims priority to U.S. Provisional Application Ser. No. 61/781,776, filed on Mar. 14, 2013, the disclosure of which is expressly incorporated herein by reference in its entirety.

BACKGROUND

Mobile computing continues to grow quickly as mobile computing devices, such as smart phones, add more power and more features. Users of such devices launch various applications, including task-based or task-centric applications, through the mobile computing devices. The task-based applications can assist a user of the mobile computing device in organizing tasks that the user is interested in.

SUMMARY

Innovative aspects of the subject matter described in this specification may be embodied in methods that include actions of receiving, by the one or more processors, user input, the user input indicating an assignment of a particular task by a first user to a second user, the first user being a user of a product that provides the particular task; determining, by the one or more processors, that the second user is a non-user of the product and, in response: appending product promotion data to an electronic document, the product promotion data providing a summary of task-based action data that is associated with the second user; and transmitting the electronic document to the second user.

Other implementations of these aspects include corresponding systems, apparatus, and computer programs, configured to perform the actions of the methods, encoded on computer storage devices.

These and other implementations may each optionally include one or more of the following features: receiving input indicating that the second user has become a user of the product and, in response, assigning the particular task to the second user; the product promotion data includes a listing of one or more tasks associated with the second user, the one or more tasks including the particular task; the one or more tasks are assigned to the second user; the one or more tasks are delegated by the second user to the first user; the product promotion data includes additional information associated with the one or more tasks, the additional information including a priority associated with each of the one or more tasks, a title associated with each of the one or more tasks, a due date associated with each of the one or more tasks, and a state associated with each of the one or more tasks; the product promotion data includes a graphical representation of a total number of tasks associated with the second user based on an assignor of each of the one or more tasks; the graphical representation includes a pie chart, with each section of the pie chart being associated with the assignor of the one or more tasks associated with the section; the first user is associated with a first section of the pie chart; a third user is associated with a second section of the pie chart, the third user being a user of the product; the product promotion data includes a graphical representation of a total number of tasks associated with the second user at one or more times; the graphical representation includes a line chart, the line chart based on a number of tasks associated with the second user at each of the one or more times; the product promotion data includes a listing of one or more tasks associated with the second user, a first graphical representation of a total number of tasks associated with the second user with based on an assignor of each of the one or more tasks, and a second graphical representation of the total number of tasks associated with the second user at one or more times; the product promotion data is appended as a footer to the electronic document; the product promotion data includes data describing the product, the data including a name of the product; the electronic document is an email.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers represent corresponding parts throughout.

DETAILED DESCRIPTION

Implementations of the present disclosure are generally directed to appending product promotion data to an electronic communication, e.g., an e-mail, to encourage a non-user of a product to become a user, e.g., member, of the product. The product promotion data can include data associated with tasks that are assigned from users of the product to the non-user. For example, the product promotion data can include a listing of tasks associated with the non-user, a total number of tasks associated with the second user based on assignor of the tasks or based on a time period. Thus, by providing such product promotion data to the non-user, the non-user is encouraged to become a user of the product.

Figure 1:
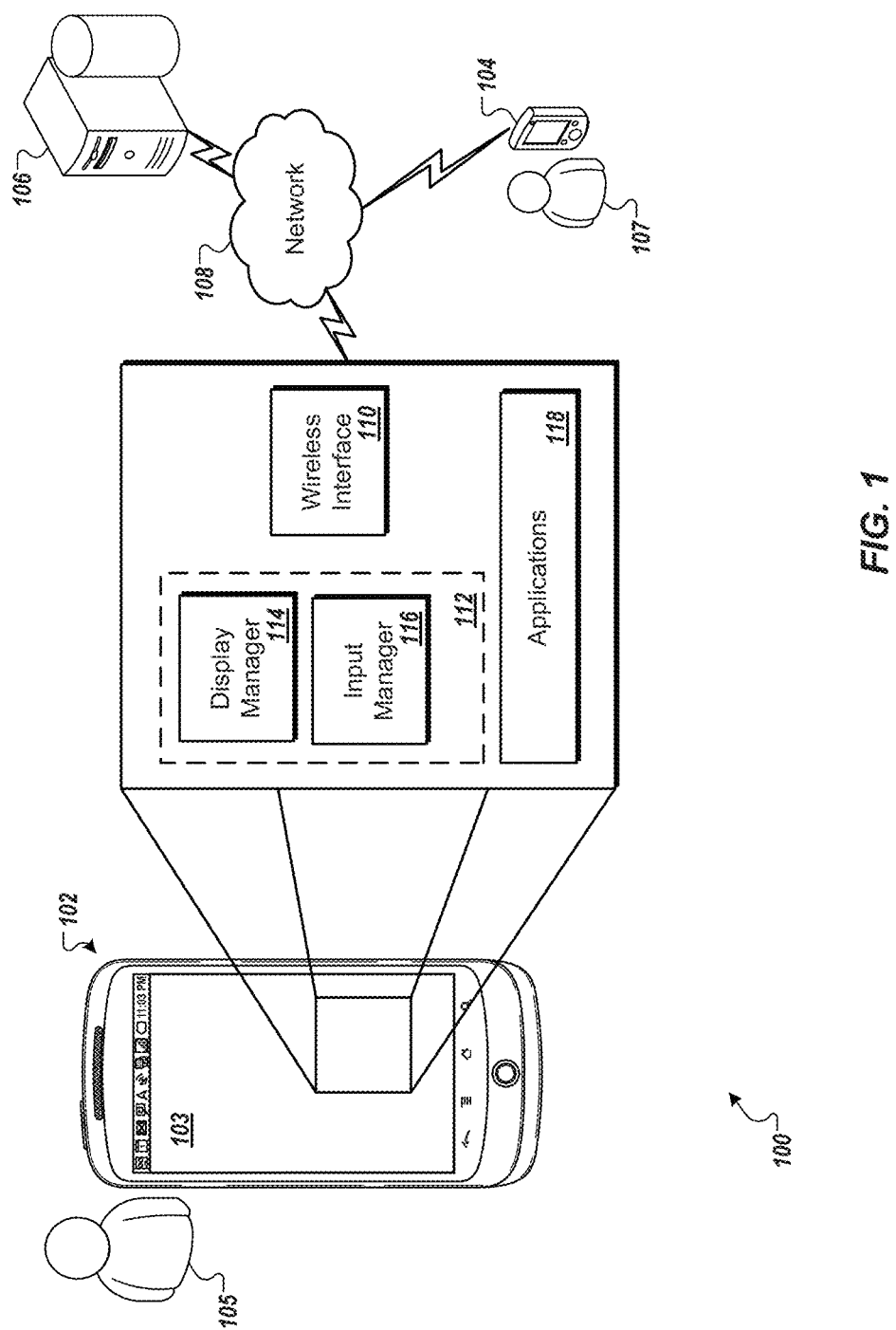
FIG. 1 depicts an example system that can execute implementations of the present disclosure.

FIG. 1 is a diagram of an example system 100 that can execute implementations of the present disclosure. In general, the system 100 includes mobile computing devices 102, 104, e.g., a smartphone, a tablet computing device, a touchscreen laptop, a touchscreen desktop, that can each communicate with a server system 106 over a network 108. It is appreciated, however, that implementations of the present disclosure can be used with other computing devices having touchscreen displays. Each of the computing devices 102, 104 is associated with a user 105, 107, respectively.

The mobile computing devices 102, 104 each include a touchscreen display 103. However, for simplicity of illustration, the touchscreen display 103 is shown only for the mobile computing device 102. In some examples, the touchscreen display 103 can provide one or more graphical user interfaces (GUIs) for the mobile computing devices 102, 104. In some examples, and as discussed in further detail below, the touchscreen display 103 can provide one or more screens on which graphical representations, e.g., of an electronic document, can be displayed to the users 105, 107. A number of components within the mobile computing devices 102, 104 provide for interaction with the mobile computing devices 102, 104. For purposes of clarity, FIG. 1 shows certain example components of the mobile computing device 102.

A number of components executed by one or more processors included in the mobile computing devices 102, 104 enable the respective users 105, 107 to interact with the touchscreen display 103 to provide input and to receive visual and/or audible output. For simplicity of illustration, the components are shown only for the mobile computing device 102. To that end, for example, an interface manager 112 can manage interaction with the touchscreen display 103, and includes a display manager 114 and an input manager 116. The display manager 114 can manage the information displayed to the user 105 using the touchscreen display 103. For example, an operating system running on the mobile computing device 102 can use the display manager 114 to arbitrate access to the touchscreen display 103 for a number of applications 118 running on the mobile computing device 102. The mobile computing device 102 can provide visual feedback. For example, visual feedback can be provided using the display manager 114 to display graphical representations on the touchscreen display 103.

In some implementations, the mobile computing devices 102, 104 can communicate with the server system 106 through the network 108, e.g., using a wireless interface 110. The network 108 can be the Internet and/or a cellular network. For example, the mobile computing devices 102, 104 can direct telephone calls through a telephone network or through a data network using voice over internet protocol (VoIP). In some examples, the mobile computing device 102 can transmit other forms of data over the Internet, for example, data in the form of Hypertext Transfer Protocol (HTTP) requests that are directed at particular web sites. The mobile computing devices 102, 104 may receive responses, for example, in forms that can include, but are not limited to, a mark-up code for generating web pages, media files, and electronic messages.

Figure 2B:
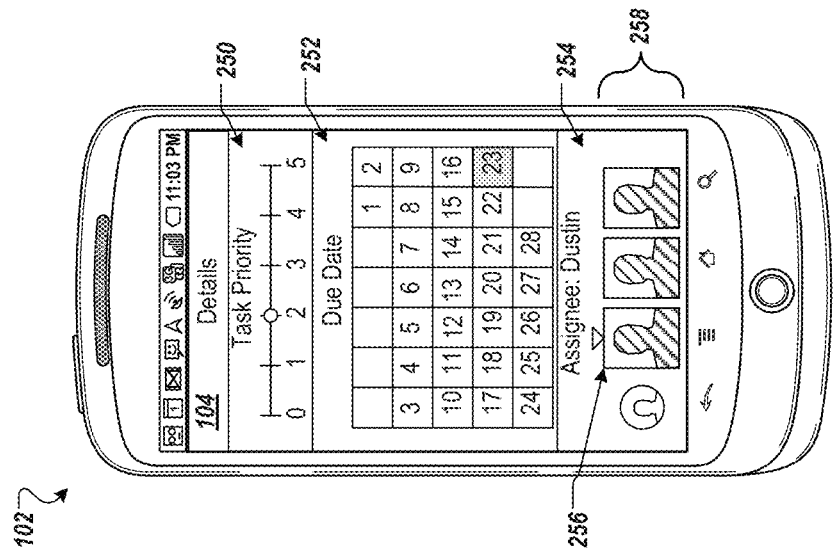
FIGS. 2A and 2B depict a task-based workflow progression.
Figure 2A:
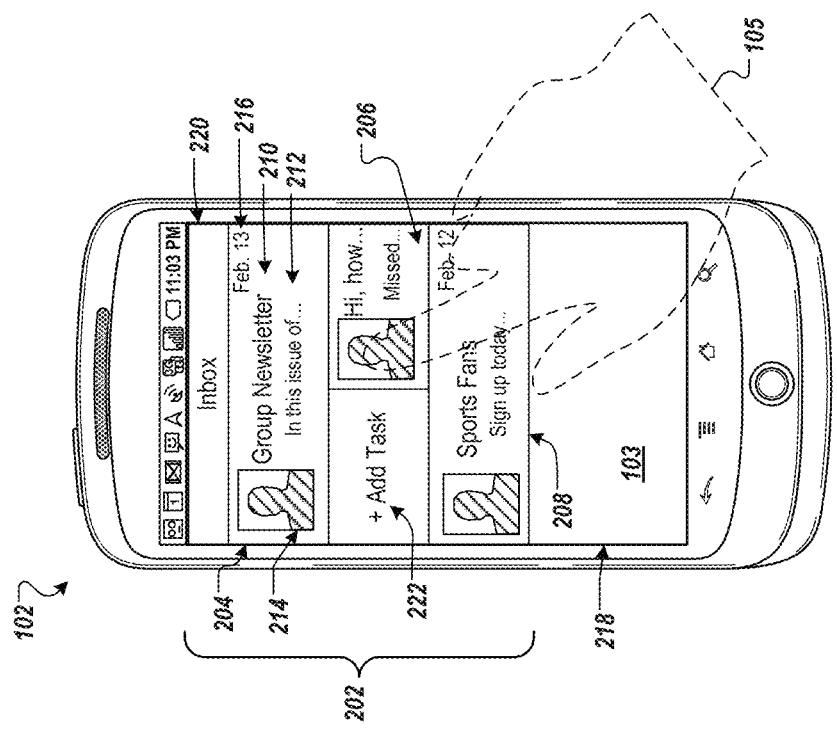

FIGS. 2A and 2B graphically depict a task-based workflow progression. Specifically, the touchscreen display 103 displays a graphical representation of an electronic document inbox 202 associated with the user 105, the electronic document inbox 202 including, or being associated with, one or more electronic documents. In some examples, the electronic documents can include e-mails or tasks and the electronic document inbox 202 can include an e-mail inbox or a task inbox. In some examples, the electronic document inbox 202 is associated with an application 118.

One or more of the electronic document inbox 202, the application 118 associated with the electronic document inbox 202, and the task-based workflow progression can be associated with a product. For example, the product can include a service that provides the electronic documents, e.g., tasks, that are associated with the electronic document inbox 202, e.g., the task inbox. In some examples, the product can include the application 118, e.g., an iPhone "app" or a Google Play "app" associated with the electronic document inbox 202. In some examples, the product can include a service provided, e.g., a "cloud"-based service, by the server system 106 in cooperation with the electronic document inbox 202 and/or the application 118 associated with the electronic document inbox 202. To that end, in some examples, the user 105 is a user of the product associated with the electronic document inbox 202.

The touchscreen display 103 can display one or more graphical representations 204, 206, 208 each associated with an electronic document. In some examples, one of the graphical representations 204, 206, 208 can be associated with two or more electronic documents, e.g., an e-mail conversation thread. Each of the graphical representations 204, 206, 208 can include a title portion 210, a body portion 212, an associated entity 214, and date 216. However, for simplicity of illustration, the title portion 210, the body portion 212, the associated entity 214, and the date 216 are shown only for the graphical representation 204. The title portion 210 includes at least a portion of a title of the associated electronic document, e.g., the subject field of an e-mail; the body portion 212 includes at least a portion of a body of the associated electronic document, e.g., the content of the e-mail; the associated entity 214 includes data associated with a person associated with the associated electronic document, e.g., the sender of the e-mail; and the date 216 includes a date of the electronic document, e.g., the date the e-mail was sent.

The user 105 can provide input to at least one of the graphical representations 204, 206, 208. The input can include a touchscreen gesture, e.g., a gesture provided by the user 105 with the touchscreen display 103. In some examples, the user 105 selects one of the graphical representations 204, 206, 208, for example, by providing a "press and hold" user input. For example, the user 105 selects the graphical representation 206 by providing a touchscreen gesture to the graphical representation 206 by selecting the graphical representation 206, e.g., providing a "press" input. The touchscreen gesture further includes providing a continuous, sliding contact with the graphical representation 206 such that a "sliding" animation of the graphical representation 206 is provided. For example, the graphical representation 206 is slid from a first side 218 of the touchscreen display 103 towards a second side 220 of the touchscreen display 103, or from the second side 220 to the first side 218.

In some examples, as the graphical representation 206 is slid from the first side 218 to the second side 220, portions of the graphical representation 206 disappear from display. For example, displayed data of the graphical representation 206 adjacent the second side 220 disappears from display. That is, data associated with the title portion 210, the body portion 212, the associated entity 214, and the date 216 of the graphical representation 206 can be removed from display, or truncated.

To that end, in response to the user 105 providing the touchscreen gesture to the graphical representation 206, the touchscreen display 103 displays, in some examples, an Add Task action element 222. The Add Task action element 222 represents an action that can be performed. For example, the Add Task action element 222 is associated with a creation of a task action. In some examples, the action associated with the Add Task action element 222 is automatically performed when the Add Task action element 222 is displayed, and the user 105 ceases contact with the graphical representation 206. In some examples, the user 105 selects the Add Task action element 222 to perform the action associated with the Add Task action element 222.

Referring to FIG. 2B, after creating the task action, the touchscreen display 103 displays action elements 250, 252, 254 that are each associated with a property of the task that is associated with the electronic document that is represented by the graphical representation 206. Specifically, the Task Priority action element 250 represents a Task Priority property associated with the task; the Due Date action element 252 represents a Due Date property associated with the task; and the Assignee action element 254 represents an Assignee property associated with the task.

The user 105 can provide input to one or more of the action elements 250, 252, 254 to adjust the values of the properties associated with the respective secondary action element 250, 252, 254. For example, the user 105 can provide input to the Task Priority action element 250, including, adjusting a task priority associated with the task, e.g., assigning a priority of two. Additionally, for example, the user 105 can provide input to the Due Date action element 252, including, selecting a desired completion date to be associated with the task, e.g., February 23. Additionally, for example, the user 105 can provide input to the Assignee action element 254, including, assigning, or delegating, the task.

In some examples, with respect to the Assignee action element 254, the user 105 selects one or more entities, or persons, to be assigned the task. For example, the user 105 selects the entity 256 to be assigned the task, that is, the Assignee property is updated to be associated with data associated with the entity 256, e.g., a name associated with the entity 256. In some examples, the user 105 can selected two or more entities, or persons, to be assigned the task. In some examples, the user 105 can assign the task to themself. In some examples, the user 105 can assign the task to two or more entities, one of the entities including the user 105.

In some implementations, the Assignee action element 254 includes for display suggested entities 258 to assign the task to. For example, the mobile computing device 102, the server system 106, or both, determine the suggested entities 258. In some examples, the suggested entities 258 are based on entities associated with the electronic document that is associated with the task. For example, the suggested entities 258 can include a sender or a receiver of the electronic document, e.g., an e-mail, or entities that are associated with a carbon copy or blind carbon copy field of the e-mail. In some examples, the suggested entities 258 are based on historical assignments of tasks by the user 105. For example, the suggested entities 258 can include entities that the user 105 has assigned to the most historically, e.g., the top three assignees by the user 105.

In some implementations, the entity 256 is the user 107 associated with the mobile computing device 104. To that end, in some examples, it is determined whether the user 107 is a user of the product. In some examples, it is determined whether the user 107 subscribes to a service provided by the product. For example, it is determined whether the user 107 is registered with the service providing the product, e.g., is a member of the product; whether the user has the application 118 associated with the electronic document inbox 202 installed on the mobile computing device 104; or whether the user has accessed a web-based application, e.g., a "web-app," from the mobile computing device 104. In some examples, any combination of the server system 106 and the mobile computing devices 102, 104 determines whether the user 107 is a user of the product.

To that end, it is determined that the user 107 is non-user of the product. For example, it is determined that the user 107 is not a user of the product. In response to determining that the user 107 is non-user of the product, product promotion data is appended, e.g., added, to an electronic document, that is transmitted to the user 107 to encourage the user 107 to become a user of the product. For example, the user 105 can communicate, e.g., transmit, the electronic document using an e-mail client application executing on the mobile computing device 102 through the network 108 such that the electronic document is received by the user 107 using an e-mail client application executing on the mobile computing device 104.

Figure 3:
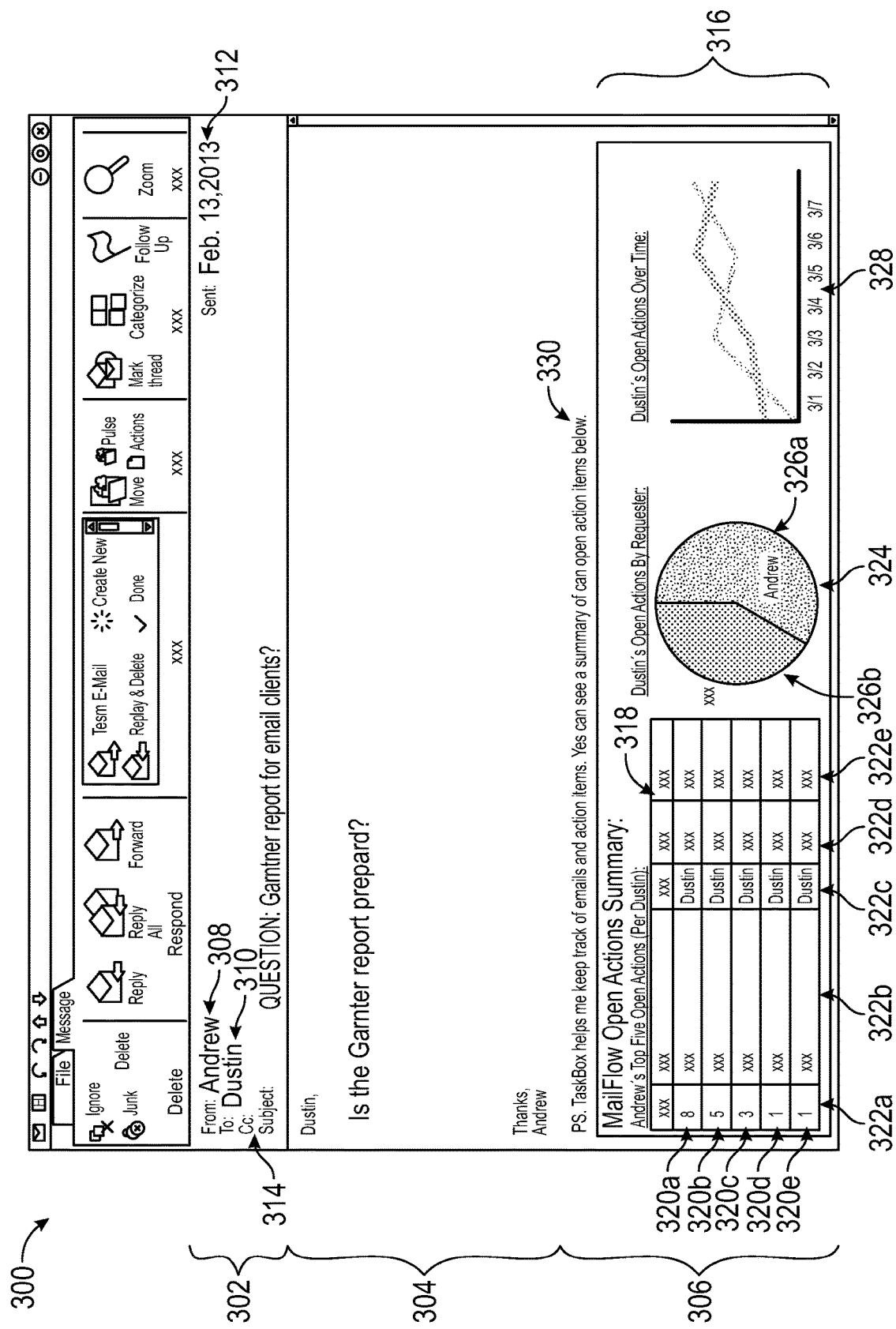
FIG. 3 illustrates an example electronic document.

FIG. 3 graphically illustrates an example electronic document 300. In some examples, the electronic document 300 includes an e-mail. The electronic document 300 includes a transmission data section 302, a body portion 304, and a footer portion 306. The transmission data section 302 includes data relating to transmission properties of the electronic document 300. For example, the transmission data section 302 includes a sender field 308, e.g., the user 105; a recipient field 310, e.g., the user 107; a subject field 310, a date field 312, and carbon copy field 314. In some examples, the transmission data section 302 further includes a blind carbon copy field. In some examples, one or more of the fields 308, 310, 312, 314 can be absent of data.

The body portion 304 includes data relating to content of the electronic document 300. For example, the body portion 304 can include text, images, video, hyperlinks, or other data that the user 105 desires to communicate to the user 107. For example, the user 105 generates the electronic document 300 such that the body portion 304 includes the text "Is the Gartner report prepared?"

The footer portion 306, or footer 306, includes product promotion data 316. The product promotion data 316 provides a summary of task-based action data that is associated with the user 107. Specifically, the task-based action data can include data associated with the product, including, data relating to tasks that are associated with or assigned to the user 107.

In some implementations, the product promotion data 316 includes a listing 318 of tasks 320a, 320b, 320c, 320d, 320e, referred to as tasks 320, that are associated with the user 107. To that end, the tasks 320 are associated with, or assigned to the user 107. In some examples, the tasks 320 are tasks that are assigned from the user 105 to the user 107, e.g. delegated to the user 107 by the user 105, through the product such that the tasks 320 are associated with the user 107. For example, in response to the user 105 assigning the task associated with the electronic document represented by graphical representation 206 to the user 107 by providing input to the Assignee action element 254, one of the tasks 320 can include the task associated with the electronic document represented by the graphical representation 206.

In some examples, the listing 318 includes fields 322a, 322b, 322c, 322d, 322e, referred to as fields 322. The fields 322 include data associated with the tasks 320. For example, the field 322a includes priority data associated with the tasks 320; the field 322b includes title data associated with the tasks 320; the field 322c includes owner data associated with the tasks 320; the field 322d includes due date data associated with the tasks 320; and the field 322 includes state data associated with the tasks 320.

In some examples, the tasks 320 are a subset of tasks that are associated with the user 107, e.g., tasks that are assigned by the user 105 to the user 107. For example, the tasks 320 can include the "top" tasks that are assigned by the user 105 to the user 107. The "top" tasks can include tasks that are the highest priority, e.g., sorted by the field 322a, or can include tasks that are due the soonest, e.g., sorted by the field 322d. However, the tasks 320 can include any subset of the tasks that are assigned by the user 105 to the user 107, and sorted by any of the fields 322.

In some examples, the listing 318 includes five tasks 320 that are associated with the user 107, however, the listing 318 can include any number of tasks 320. For example, the number of tasks 320 can be based on a size of the electronic document 300, or based on the user 105, the user 107, or both.

In some implementations, the product promotion data 316 includes a graphical representation 324 of a total number of tasks that are associated with the user 107 based on an assignor of the tasks. Specifically, for each assignor of the tasks associated with the user 107, the graphical representation 324 is a numerical proportion of the total tasks associated with the user 107 based on the respective assignor. In some examples, the graphical representation 324 includes a pie chart having sections 326a, 326b, referred to as sections 326. Each of the sections 326a, 326b represents the numerical portion of tasks of the total tasks associated with the user 107 for the assignor associated with the section 326a, 326b. For example, the section 326a is associated the numerical portion of tasks that are assigned by the user 105 to the user 107 of the total tasks associated with the user 107, e.g. tasks assigned by the user 105 "Andrew;" and the section 326b is associated with the numerical portion of tasks that are assigned by an additional user to the user 107 of the total tasks associated with the user 107; e.g., tasks assigned by the additional user "Jessica." In some examples, the additional user "Jessica" is a user of the product associated with the tasks. In some examples, the graphical representation 324 can includes a bar chart. In some examples, the graphical representation 324 can include a pie chart and a bar chart.

In some implementations, the product promotion data 316 includes a graphical representation 328 of a total number of tasks associated with the user 107 at one or more times. Specifically, for a particular time, e.g., a date, the graphical representation 328 reflects a total number of tasks associated with the user 107. In some examples, the graphical representation 328 includes line chart. The line chart is based on the number of tasks associated with the user 107 at one or more times, e.g., a historical reflection of the number of tasks associated with the user 107. In some examples, the line chart can be further based on an assignor of the tasks. That is, the line chart can be based on the number of tasks assigned by an assignor to the user 107 at one or more times.

In some examples, the production promotion data 316 can further include data 330 describing the product. Specifically, the data 330 can include a name of the product, or a promotional advertisement associated with the product.

To that end, the electronic document 300, including the footer 306 and the product promotion data 316, is transmitted to the user 107, as described above. In response to receiving the electronic document 300, the user 107 can provide input indicating that the user 107 has become a user of the product. In some examples, in response to receiving the electronic document 300, the user 107 can subscribe to the service provided by the product. For example, the user 107 registers with the service provided by the product, e.g., becomes a member of the product; the user 107 installs the application 118 that is associated with the tasks, e.g., associated with the electronic document inbox 202, on the mobile computing device 104; or the user 107 accesses a web-based application, e.g., a "web-app," associated with the tasks from the mobile computing device 104.

Figure 4:
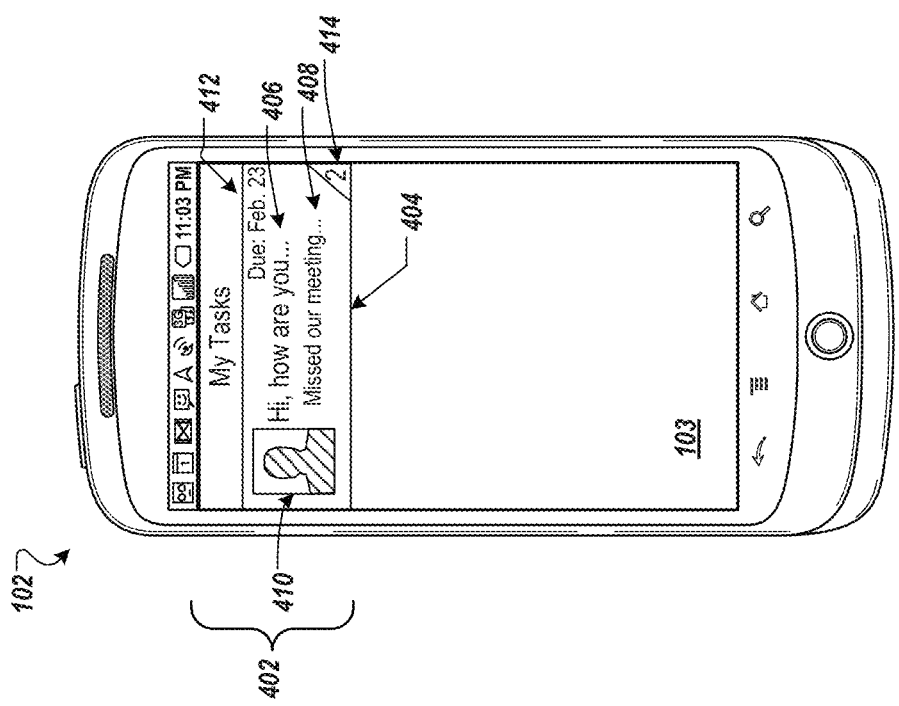
FIG. 4 depicts a graphical representation of a task inbox.

In response to the user 107 becoming a user of the product, the task associated with the electronic document represented by the graphical presentation 206 is assigned to the user 107. For example, the Assignee property associated with the task associated with the electronic document represented by the graphical representation 206 is updated to be associated with data associated with the user 107. Thus, the task can be presented in an electronic document inbox associated with the user 107. Specifically, FIG. 4 graphically depicts a graphical representation of a task inbox 402 associated with the user 107, e.g., after associating the task with the user 107. Specifically, the task inbox 402 includes a graphically depiction of tasks that are associated with the user 107. For example, as mentioned above, in response to creating the task that is associated with the electronic document represented by the graphical representation 206, and with the Assignee property of the task associated with the user 107, a graphical representation 404 of the task is displayed within the task inbox 402. The user 107 can navigate to the task inbox 402 by any number of methods, including selecting the task inbox 402 from a pull down menu.

The graphical representation 404 can include a title portion 406, a body portion 408, an assignee portion 410, a due date 412, and a priority 414. The title portion 406 includes at least a portion of the title of the associated task; the body portion 408 includes at least a portion of the body of the associated task; the assignee portion 410 includes an entity that is assigned to the task; the due date 412 includes a due date of the task; and the priority 414 includes a propriety of the task. In some implementations, data associated with the title portion 406, the body portion 408, the assignee portion 410, the due date 412, and the priority 414 can be populated with data associated with the electronic document represented with the graphical representation 206.

In some implementations, the tasks of the task inbox 402 can be sorted by any appropriate metric, including the assignee of the task, the priority of the task, and the due date of the task. In some implementations, the touchscreen display 103 can further display similar graphical representations of an assigned, or delegated, task inbox and a completed task inbox.

Figure 5:
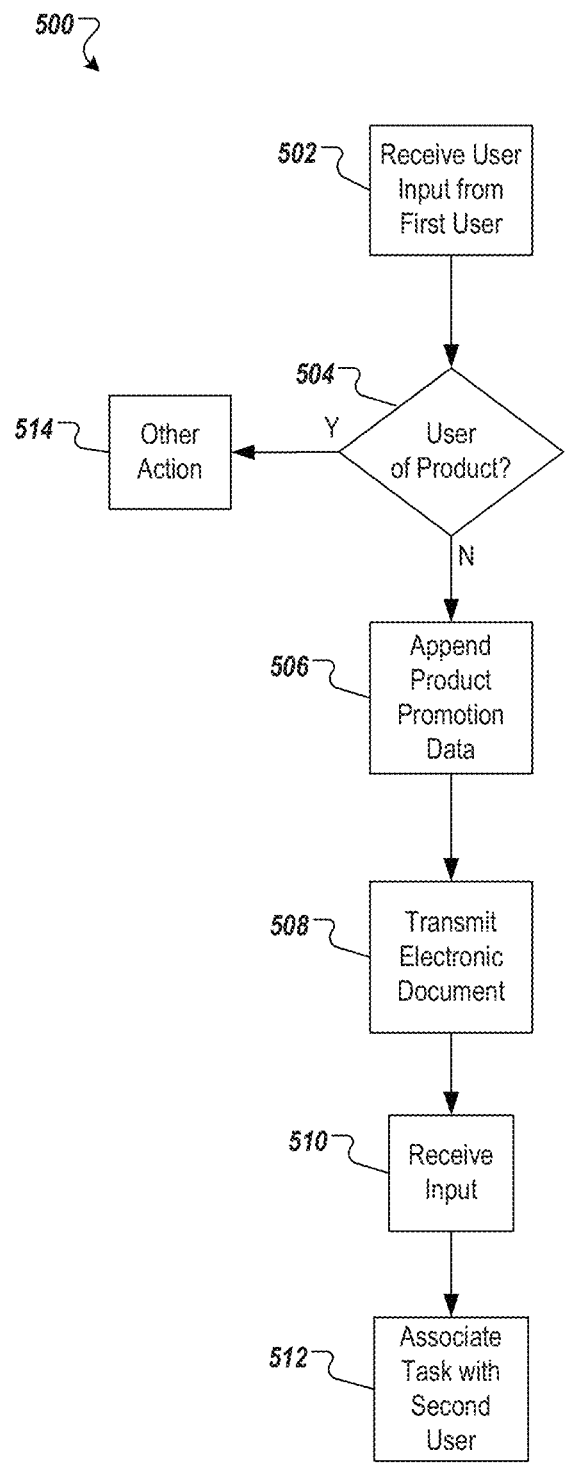
FIG. 5 depicts an example process that can be executed in accordance with implementations of the present disclosure.

FIG. 5 depicts an example process 500 that can be executed in accordance with implementations of the present disclosure. The example process 500 can be provided as one or more computer-executable programs executed using one or more computing devices. For example, any combination of the mobile computing devices 102, 104 and the server system 106 can be used to execute the example process 500.

Input from a first user is received (502). Specifically, the input indicates an assignment of a particular task by the first user to a second user. For example, the user 105 provides input to the Assignee action element 254 to assign the task associated with the electronic document represented by the graphical representation 206 to the user 107. In some examples, the first user is a user of the product that provides the particular task. For example, the user 107 is a user of the product.

It is determined that the second user is a non-user of the product (504). For example, it is determined that the user 107 is a non-user of the product, e.g., whether the user 107 subscribes to a service provided by the product. In response to determining that the second user is a non-user of the product, product promotion data is appended to an electronic document (506). The product promotion data provides a summary of task-based action data that is associated with the second user. For example, the product promotion data 316 is appended to the electronic document 300. The product promotion data 316 provides a summary of task-based action data that is associated with the user 107. The electronic document is transmitted to the second user (508). For example, the electronic document 300 is transmitted to the user 107.

User input is received indicating that the second user has become a user of the product (510). For example, the user 107 becomes a user of the product, e.g., subscribes to the service provided by the product. In response to the second user becoming a user of the product, the particular task is assigned to the second user. For example, the task associated with the electronic document represented by the graphical representation 206 is assigned to the user 107.

In response to determining that second user is a user of product, an other action is performed (514).

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the present disclosure can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the present disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method executed using one or more processors, the method comprising:
    detecting, by the one or more processors, a first user input associated with an email item in an inbox user interface, the first user input comprising a sliding gesture from a first side of a touchscreen display towards a second side of the touchscreen display;
    generating, by the one or more processors, an add task element displayed within a previous location of the email item as a sliding animation moves the email item towards the second side of the touchscreen display;
    creating, by the one or more processors, a task based on the add task element, wherein a user is assigned to the task based on a second user input that selects the user through an updated user interface;
    determining, by the one or more processors, that the user is a non-user of a product;
    appending, by the one or more processors, a summary of task-based action data associated with the user to an electronic document associated with the email item in the inbox user interface, the summary of task-based action data including data associated with the assignment of the task to the user; and
    transmitting, by the one or more processors, the electronic document to a device associated with the user.

2. The method of claim 1, further comprising receiving input indicating that the user has become a user of the product.

3. The method of claim 1, wherein the summary of task-based action data includes a listing of one or more tasks associated with the user, the one or more tasks including the task.

4. The method of claim 1, wherein the task is created based on the sliding gesture being completed while the add task element is displayed.

5. The method of claim 3, wherein the sliding gesture comprises continuous sliding contact with the email item as the sliding animation moves the email item towards the second side of the touchscreen display.

6. The method of claim 3, wherein the summary of task-based action data includes additional information associated with the one or more tasks, the additional information including a priority associated with each of the one or more tasks, a title associated with each of the one or more tasks, a due date associated with each of the one or more tasks, and a state associated with each of the one or more tasks.

7. The method of claim 1, wherein the summary of task-based action data includes a graphical representation of a total number of tasks associated with the user based on an assignor of each of the one or more tasks.

8. The method of claim 7, wherein the graphical representation includes a pie chart, with each section of the pie chart being associated with the assignor of each of the one or more tasks associated with the section.

9. The method of claim 1, further comprising generating a task properties interface based on a selection of the add task element, the task properties interface comprising a due date element that sets a desired completion date for the task.

10. The method of claim 1, wherein a server determines that the user is a non-user of the product based on a registration status associated with the product.

11. The method of claim 3, wherein the summary of task-based action data includes a graphical representation of a total number of tasks associated with the user at one or more times.

12. The method of claim 11, wherein the graphical representation includes a line chart, the line chart based on a number of tasks associated with the user at each of the one or more times.

13. The method of claim 1, wherein the summary of task-based action data includes a listing of one or more tasks associated with the user, a first graphical representation of a total number of tasks associated with the user based on an assignor of each of the one or more tasks, and a second graphical representation of the total number of tasks associated with the user at one or more times.

14. The method of claim 1, wherein the summary of task-based action data is appended as a footer to the electronic document.

15. The method of claim 1, wherein the summary of task-based action data includes data describing the product, the data including a name of the product.

16. The method of claim 1, wherein the electronic document is an email.

17. A computer-readable medium coupled to one or more processors having instructions stored thereon which, when executed by the one or more processors, cause the one or more processors to:
    detect, by the one or more processors, a first user input associated with an email item in an inbox user interface, the first user input comprising a sliding gesture from a first side of a touchscreen display towards a second side of the touchscreen display;
    generate, by the one or more processors, an add task element displayed within a previous location of the email item as a sliding animation moves the email item towards the second side of the touchscreen display;
    create, by the one or more processors, a task based on the add task element, wherein a user is assigned to the task based on a second user input that selects the user through an updated user interface;
    determine, by the one or more processors, that the user is a non-user of a product;
    append, by the one or more processors, a summary of task-based action data associated with the user to an electronic document, the summary of task-based action data including data associated with the assignment of the task to the user; and
    transmit, by the one or more processors, the electronic document to a device associated with the user.

18. A computing device, comprising:
    one or more processors; and
    a computer-readable medium coupled to the one or more processors and having instructions stored thereon which, when executed by the one or more processors, cause the one or more processors to:
        detect, by the one or more processors, a first user input associated with an email item in an inbox user interface, the first user input comprising a sliding gesture from a first side of a touchscreen display towards a second side of the touchscreen display;
        generate, by the one or more processors, an add task element displayed within a previous location of the email item as a sliding animation moves the email item towards the second side of the touchscreen display;
        create, by the one or more processors, a task based on the add task element, wherein a user is assigned to the task based on a second user input that selects the user through an updated user interface;
        determine, by the one or more processors, that the user is a non-user of a product;

append, by the one or more processors, a summary of task-based action data associated with the user to an electronic document, the summary of task-based action data including data associated with the assignment of the task to the user; and transmit, by the one or more processors, the electronic document to a device associated with the user.

19. The computer-readable medium of claim 17, wherein the instructions, when executed, cause the one or more processors to receive input indicating that the user has become a user of the product.

20. The computing device of claim 18, wherein the summary of task-based action data includes a listing of one or more tasks associated with the user, a first graphical representation of a total number of tasks associated with the user based on an assignor of each of the one or more tasks, and a second graphical representation of the total number of tasks associated with the user at one or more times.

* * * * *